United States Patent
Tseng et al.

(10) Patent No.: US 8,180,022 B2
(45) Date of Patent: May 15, 2012

(54) LINEAR X-RAY DETECTOR USING FIBER OPTIC FACE PLATE TO ALTER OPTICAL PATH

(75) Inventors: Hsin-Fu Tseng, Los Altos, CA (US); Linbo Yang, Pleasanton, CA (US)

(73) Assignee: X-Scan Imaging Corporation, San Jose, CA (US)

( * ) Notice: Subject to any disclaimer, the term of this patent is extended or adjusted under 35 U.S.C. 154(b) by 0 days.

(21) Appl. No.: 12/589,592

(22) Filed: Oct. 26, 2009

(65) Prior Publication Data

US 2011/0096904 A1    Apr. 28, 2011

(51) Int. Cl.
*H05G 1/64* (2006.01)
*G01T 1/20* (2006.01)

(52) U.S. Cl. ... 378/98.3; 250/368; 250/369; 250/370.09
(58) Field of Classification Search .......... 378/98.3, 378/98.8; 250/368, 369, 370.09
See application file for complete search history.

(56) References Cited

U.S. PATENT DOCUMENTS

| | | | | |
|---|---|---|---|---|
| 5,008,547 A * | 4/1991 | Molteni et al. | ............... | 250/368 |
| 5,331,166 A * | 7/1994 | Yamamoto et al. | ...... | 250/370.11 |
| 5,391,879 A * | 2/1995 | Tran et al. | ................ | 250/367 |
| 5,550,380 A * | 8/1996 | Sugawara et al. | ........ | 250/370.11 |
| 5,572,034 A * | 11/1996 | Karellas | ................ | 250/368 |
| 5,631,943 A * | 5/1997 | Miles | ................ | 378/102 |
| 5,693,948 A * | 12/1997 | Sayed et al. | ............ | 250/370.09 |
| 6,031,892 A * | 2/2000 | Karellas | ................ | 378/98.3 |
| 6,042,267 A * | 3/2000 | Muraki et al. | ............... | 378/169 |
| 6,064,715 A * | 5/2000 | Sklebitz et al. | .............. | 378/37 |
| 6,479,827 B1 * | 11/2002 | Hamamoto et al. | ........ | 250/370.11 |
| 7,010,092 B2 * | 3/2006 | Winsor | .............. | 378/98.9 |
| 7,286,640 B2 * | 10/2007 | Yun et al. | ................ | 378/98.9 |
| 7,463,716 B2 * | 12/2008 | Tseng | ................ | 378/98.8 |
| 7,463,717 B2 * | 12/2008 | Tseng | ................ | 378/98.8 |
| 2008/0061243 A1 * | 3/2008 | Doshi et al. | ................ | 250/368 |

* cited by examiner

*Primary Examiner* — Allen C. Ho
(74) *Attorney, Agent, or Firm* — Carr & Ferrell LLP (57) ABSTRACT

An X-ray line-scan camera utilizes an image transferring means to alter the optical path and thus eliminates the X-ray radiation damage on the electrical components of the camera system. The camera comprises a layer of scintillating material, a fiber optic face plate (FOFP) block, and an array of image sensors. One face of the FOFP block is bonded to the surface of the image sensors. The layer of scintillating material is placed on other face of the FOFP block and used to convert an impinging X-ray beam into visible light. The FOFP block is used to transfer the visible light from the scintillating layer onto the image sensor array, which in turn converts the visible light into electrical video signals. The FOFP block has a rotation angle of 32 to 40 degree relative to the impinging X-ray beam to prevent direct impingement of the X-ray beam onto the image sensors.

10 Claims, 8 Drawing Sheets

LINEAR X-RAY DETECTOR USING FIBER OPTIC FACE PLATE TO ALTER OPTICAL PATH

CROSS-REFERENCE TO RELATED APPLICATIONS

The present invention is related to U.S. Pat. Nos. 7,463,717 B2 and 7,463,716 B2, in which an optical component is used to alter the optical path away from the X-ray beam path to avoid radiation damage on the electrical components in an X-ray detecting system.

BACKGROUND OF THE INVENTION

1. Field of the Invention

The present invention pertains generally to the field of solid-state X-ray imagers and displays, and more particularly is an improved method that structurally alters the optical path to reduce or avoid radiation damage to the semiconductor components used to process the detected X-ray images.

2. Background of the Invention

As used in this disclosure, X-rays are defined as ionizing electromagnetic radiation that is damaging to semiconductor-based image sensor arrays. X-rays also include the radiation known as "extreme ultraviolet radiation" and "gamma rays". Since few X-rays with energies exceeding 10 KeV are captured by semiconductor-based image sensor arrays (Si, Ge, etc.), the X-ray energies must be converted into a detectable form. The image sensor arrays are processed on silicon and are only sensitive to light with wavelengths at or near the visible spectrum. Therefore, the arrays require an X-ray-to-visible-light converter in order to detect the X-rays. To this end, X-ray sensitive scintillating materials, such as $Gd_2O_2S$:Tb (GOX or GADOX), CsI(Tl) or $CdWO_4$ have been used. These materials greatly enhance the detection efficiency of higher energy X-rays in silicon based sensor arrays through the ability of the scintillating materials to scintillate and emit visible light photons proportional to the X-ray energy. The visible light photons are converted to electrical signals by a silicon based image sensor array, such as a Linear Photodiode Array (PDA). When the image sensor array is read out, the array sequentially produces a stream of electrical video signals from each photo-element with amplitudes proportional to the intensity of the X-ray pattern that impinges on the photo-elements.

However, a problem arises in that the scintillation layer on top of the silicon photo-elements will not absorb the X-ray photons completely. Some portion of the X-ray particles penetrates the scintillation layer and is captured by the image sensor array structure, causing irreversible radiation damage to the image sensor array. Therefore, if the image sensor array used in the X-ray imaging system lies in the X-ray path and is not isolated or protected from X-ray exposure, radiation damage will be inflicted on the silicon image sensor array. As a result, the silicon array used in an X-ray imaging system has a limited useful lifetime.

Figure 1:
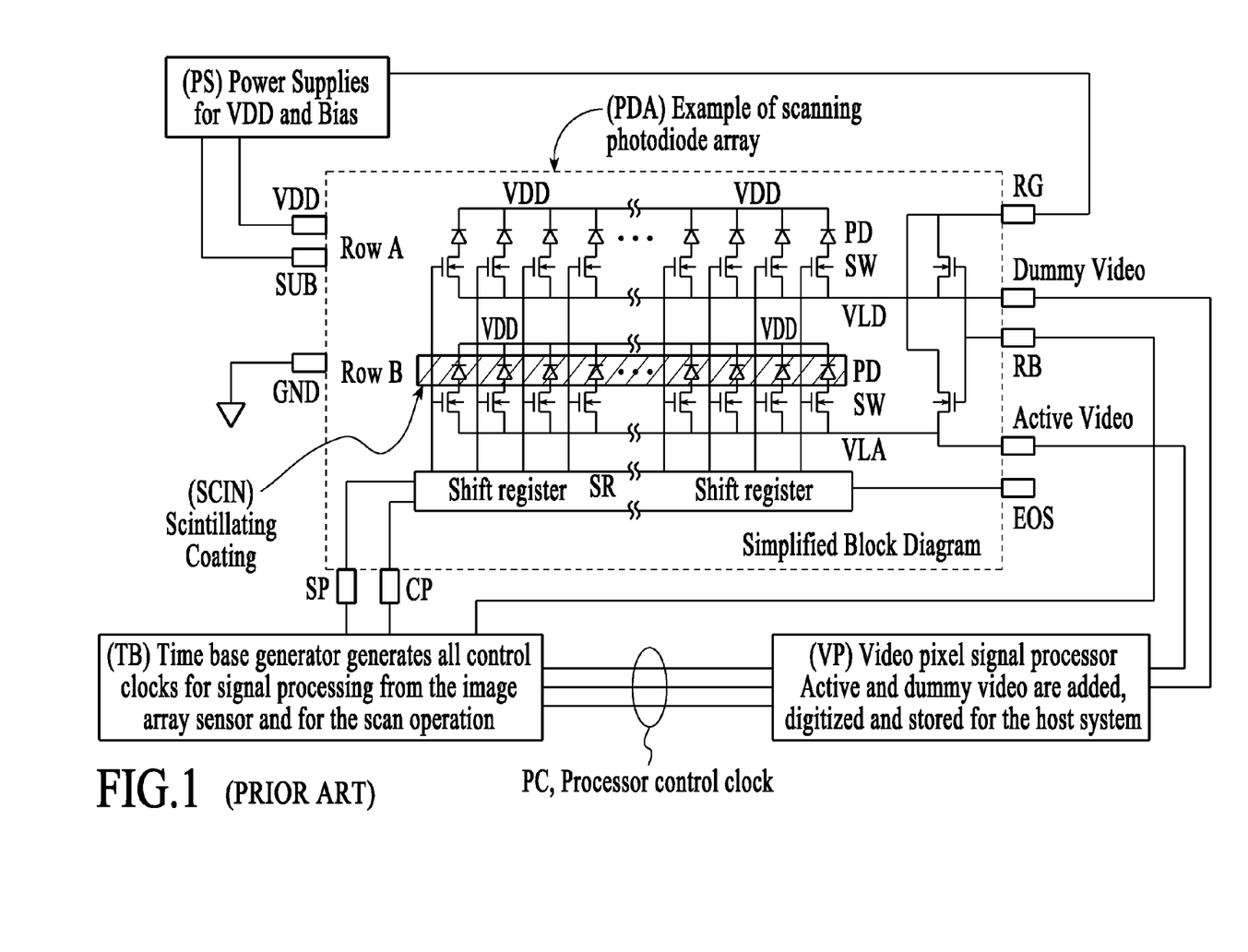
FIG. 1 illustrates a simplified electrical block diagram of a prior art Direct Coupled Detector System.

FIG. 1 is a simplified electrical block diagram describing the signal processing required for an X-ray detector system. Since the present invention involves only the optical and mechanical structures of such systems, the generalized electrical block diagram shown in FIG. 1 is demonstrative of the signal processing circuitry used in all the systems described herein.

In FIG. 1, the detector is a CMOS device with an image sensor array, a PDA, and the readout control circuits for the array. As is known in the art, the PDA is an array of photodiodes with on-chip control circuits for scanning and reading out video signals. In FIG. 1, the PDA is shown with two rows of photodiodes (PD), Row A and Row B. Row A is a dummy row of dark photodiodes used as a reference to differentially cancel any common mode noise from the active video signal, Row B. Row A is covered with metal to shield the photodiodes from light exposure.

Row B has a light sensing area exposed through a narrow slit in the metal to form a narrow aperture over the length of its read line. When the active photodiodes are exposed to imaging light, each diode collects the photons in the immediate area and converts them to signal charges. The signal charges are stored in the depletion layer capacitance of each individual photodiode. The stored charges are read out during the scanning readout process of the PDA. During one line-scan time, which is known as the integration time, each photodiode goes through an integration process. In the integration process, each photodiode is read out and then reset to its initial condition to start collecting photons and converting them to charges for the following line-scan time. Since the readout is sequential, while the PDA is continuously scanning, each photodiode sequentially goes through the photon collection (integration) process during one line-scan time.

The scanning process is initiated by a start pulse, SP. Since the integration time is equal to the line-scan time, the line rate of the video signal is determined by the time required to generate the start pulse, which initiates the scanning of the shift register, SR. As the SR shifts a pulse through its register, two rows of MOS switches, SW, that are in series with the PD are accessed. The pulse from the SR closes two switches. One switch is on the dummy video line, VLD, and the other switch is on the active video line, VLA. As the pulse from the SR accesses the SW, the charges from the accessed PD flow out on to the VLA. The photon converted charges are sent to the signal processing circuit, VP, where the charges are differentially added to the reference charges from the VLD, digitized, and stored for the host computer to perform image processing.

To form a Direct Coupled X-ray Detector, a uniform layer of the scintillating material, SCIN, is deposited directly on the sensing areas of the PDA, or a uniform layer of the scintillating material is placed directly on top of the sensing areas of the PDA. The shaded area with diagonal lines in FIG. 1 shows a SCIN layer that has been deposited over the active PD. SCIN is a uniform coated layer that emits photons when its atoms are excited by the impinging beams of the X-ray. The light energies, proportional to the intensity of the X-ray beams, directly expose the active sensing areas of the image sensors and are processed as describe above.

Figure 2A:
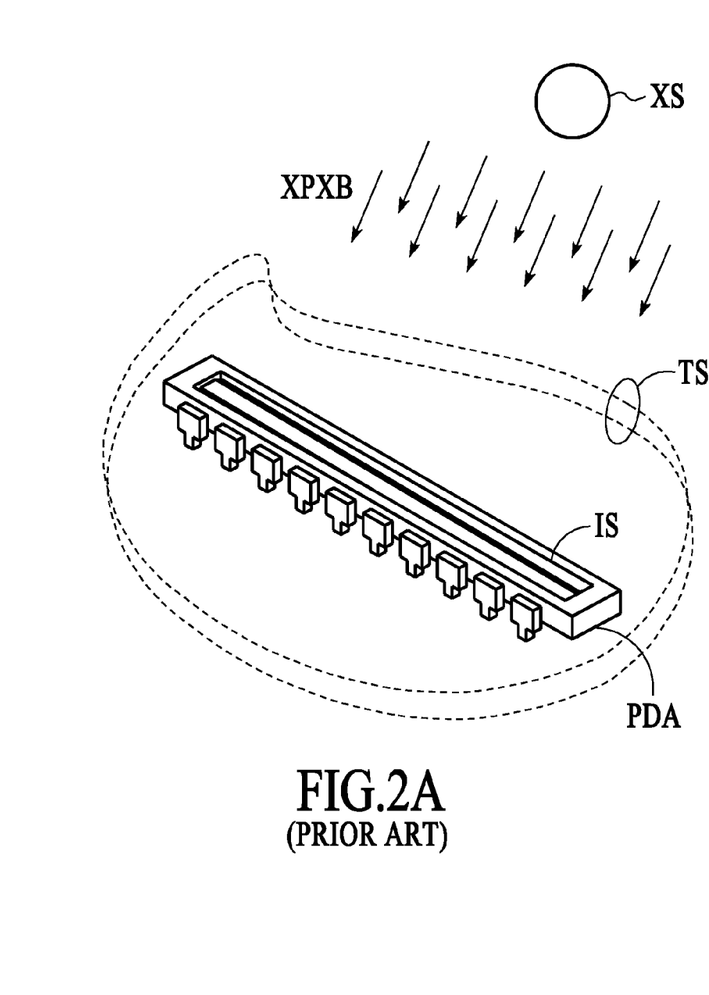
FIG. 2a is an isometric view of the system.
Figure 2B:
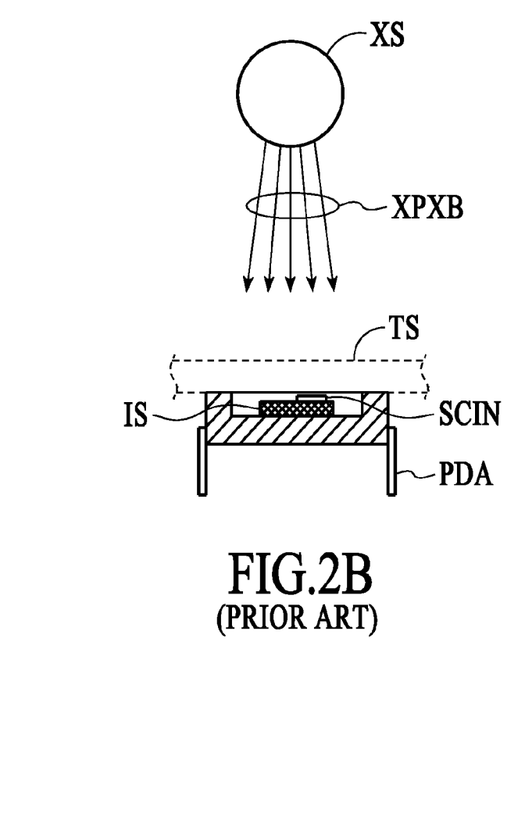
FIG. 2b is a sectional view.

FIGS. 2a-b show the optical and mechanical components of one of the current art X-ray detector systems commonly used today, a Direct Coupled Detector System. This system is the least complicated in terms of fabrication and applications, and therefore results in lower cost than other systems. The details of the drawing are limited to components relevant to the present invention.

FIG. 2a shows an isometric view of the components: the image sensors (IS), the test specimen (TS), the exposing X-ray beam (XPXB), etc. FIG. 2b is a sectional view. In FIGS. 2a-b, the PDA; the test specimen under X-ray imaging (TS); the exposing X-ray beam (XPXB); and the scintillation coating (SCIN) on the sensor die are depicted to show the geometrical relationship among the components involved in X-ray testing of the test specimen, TS.

In operation, the X-ray source emanates the exposing X-ray beam and exposes the test specimen. The X-ray flux patterns are modulated by the specimen under testing as the flux pattern passes onto the surface of the scintillation coating. Since the scintillation coating is coated directly onto the surface of the image sensor, the converted light energies proportional to the X-ray flux patterns are integrated by the image sensor array as it generates the image video signals.

The Direct Coupled Detector System in FIG. 2 shows that the exposing X-ray beam passes through the test specimen, the scintillating layer, and the image sensor array. Accordingly the image sensor array receives that portion of the X-ray flux which is not absorbed by the scintillation layer, causing radiation damage on the silicon sensor. In many applications this radiation exposure is intolerable because it drastically reduces the lifetime of the image sensor array, thereby requiring continual replacement and maintenance of the X-ray imaging system.

Although applying the scintillating layer directly to the image sensor is intolerable for many applications, the primary advantages of the method arise from its simplicity in structure and the close proximity of the scintillating layer to the image sensor array, which improves imaging resolution. Among the advantages of this system is that the detectors are simple to fabricate, i.e., the detectors can be fabricated by simply applying a SCIN coating process to existing image array sensors, such as the PDA. This is a great advantage in applications where a shorter lifetime X-ray detector system is required, for example, in destructive testing where the measuring equipment is also destroyed.

Another advantage of a Direct Coupled Detector System arises from the close proximity of the scintillation layer and the photo-element. Since the scintillating coating is in contact with the image plane of the image sensor array, there is little or essentially no space between them. This close proximity gives the detector the ability to retain its optimum resolution and Modulation Transfer Function (MTF).

Another advantage of the system, arising from the close proximity of the scintillating layer and the PDA, is the light coupling efficiency, i.e., there is very little light energy loss in the transmission between the scintillating layer and the PDA. Another advantage, which arises from its simple structure, is that the system can be implemented in a small enclosure. The ability to use the system in a small enclosure also allows the system to be designed as a portable unit.

However, there are also several drawbacks to the Direct Coupled Detector System. The system user must tolerate a shorter lifetime for the X-ray detector system in a given application, and the PDA must be continually replaced. Therefore, the Direct Coupled Detector System has a high maintenance cost, and requires a significant amount of down time.

Another disadvantage of the Direct Coupled Detector System arises from the noise properties of the PDA. Sensor noise increases with an increasing dose of radiation exposures due to the build-up of undesirable charges in the oxide and silicon interface. Therefore, as the system is used, the noise level increases and the system signal-to-noise ratio decreases. Since noise build-up is a function of radiation exposure, the system performance degrades slowly while the system is in use.

A third disadvantage of the Direct Coupled Detector System is that the leakage current of the image sensor increases as the interface charge builds up during operation under X-ray exposure. As the leakage current increases, the storage space in the photodiode is decreased until it is rendered unusable. Again since the leakage current build up is proportional to the total dose of X-ray exposure, the system performance will also degrade with time due to leakage current build up.

A fourth disadvantage in the current art Direct Coupled Detector System is that when some of the X-ray photons pass through the scintillation layer and are absorbed by the photodiode, large signal spikes are created that increase the noise level of the video signal.

Figure 3A:
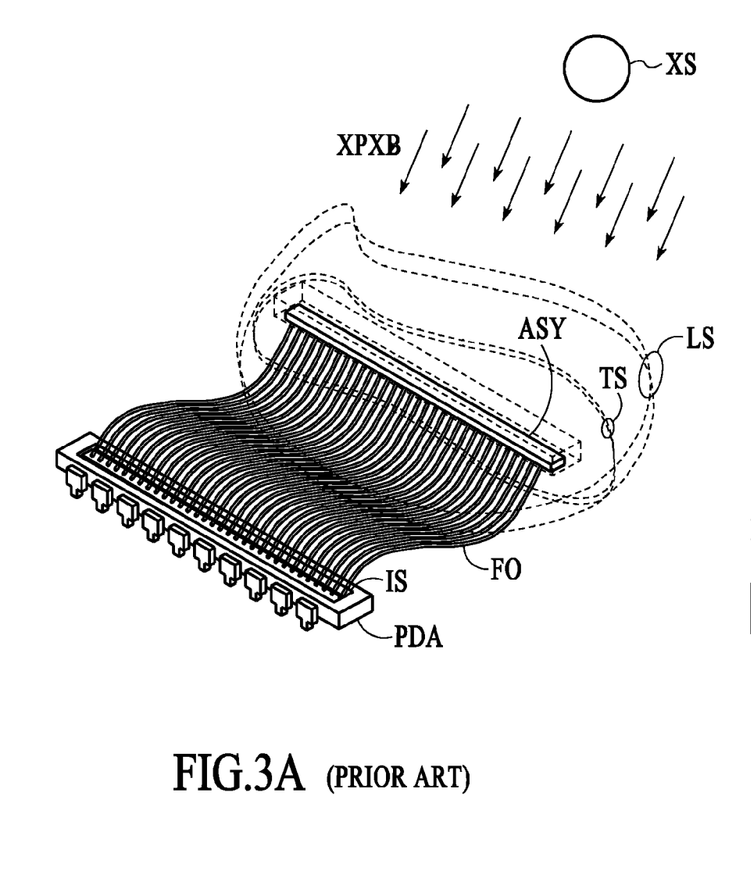
FIG. 3a is an isometric view of the system.
Figure 3B:
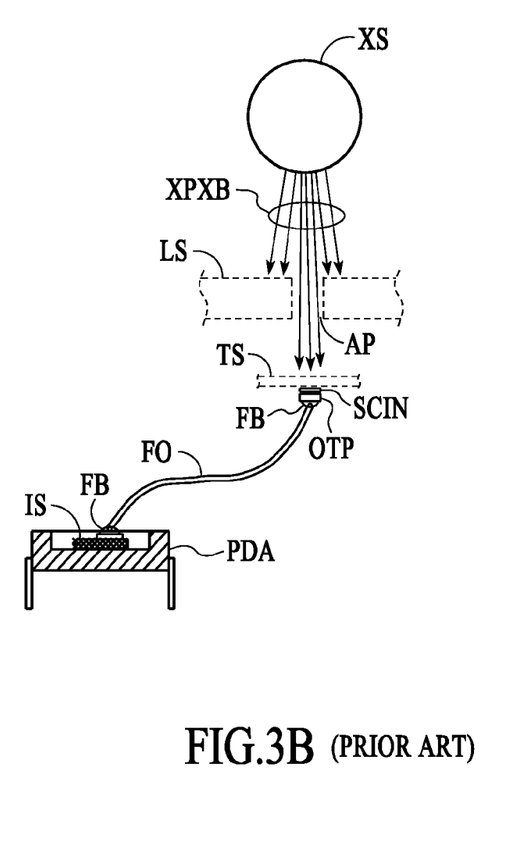
FIG. 3b is a sectional view.

A second prior art system, the Fiber Optics Coupled Detector System, employs a fiber optics bundle to transmit the light from the scintillating layer to the PDA. The object of this system is to isolate the PDA and its electronic components from the exposing X-ray beam. FIGS. 3a-b summarize the optical-mechanical configuration of a Fiber Optics Coupled Detector System. The components of the system are an X-ray source (XS); an exposing X-ray beam (XPXB); a lead shield (LS) with a slit to form an aperture (AP); a test specimen (TS) undergoing X-ray examination; scintillating layer (SCIN) that is coated onto the surface of an optical flat transparent transmission plate (OTP); an image sensor DIP package (PDA); a fiber optic bond (FB); a fiber optic bundle (FO); and an image sensor (IS). The X-ray-to-light converter assembly (ASY) represents the assembly of the scintillating layer, the optical transmission plate, and the fiber optic bond.

The X-ray source passes through the aperture to limit the area of the X-ray beam exposure to the neighborhood of the X-ray-to-light converter assembly. The X-ray-to-light converter assembly converts the modulated X-ray flux densities, proportional to the density patterns in the test specimen, to proportional light intensities. The light intensities are coupled into the fiber optic bundle through the fiber bond. The fiber optic bundle couples the light flux down to and through a second fiber bond that couples the light flux onto the surface of the image sensor, where the light flux is integrated and processed. The fiber optic transmission line gives the detector the ability to remotely place the X-ray-to-light converter assembly, hence isolating the PDA and its associated electronic circuits from the path of the exposing X-ray beam. Remotely locating the X-ray detector assembly from the electronic assembly separates the optical path from the X-ray path and achieves the objective of protecting the electronic circuit components from radiation damage.

A second advantage of the Fiber Optics Coupled Detector System is the preservation of the resolution. A fiber optic bundle has a relatively high optical resolution. However, the fiber optic bundle does create a disadvantage for the system in that glass fiber bundles are expensive and difficult to fabricate.

A second disadvantage of the Fiber Optics Coupled Detector System is the difficulty of assembly. The glass bundles are difficult to mount and bond. They must be critically aligned and bonded to their transmitting and receiving components to avoid undue optical transmission losses. The alignment constraint is even greater in the case of bonding the fiber optic ends to the surface of the elements of an image sensor because the fiber ends must be cut to exactly match the surface of the image array elements.

A third disadvantage of the Fiber Optics Coupled Detector System is the constraints imposed on the design of the enclosure. The complicated method used in bonding and mounting the fiber optic bundle requires a supporting structure within the enclosure. The supporting structure, which needs to be flexible enough to make initial adjustments, must also serve as a rigid mount to ensure that the bonded ends remain stationary in transportation and operation. Especially critical in adjusting and mounting are the contacts between the scintillating layer and the optical flat transparent transmission plate and at the fiber bond on the image sensor surfaces. The degree of careful handling required becomes even greater in a two-dimensional application of this X-ray system.

Figure 4:
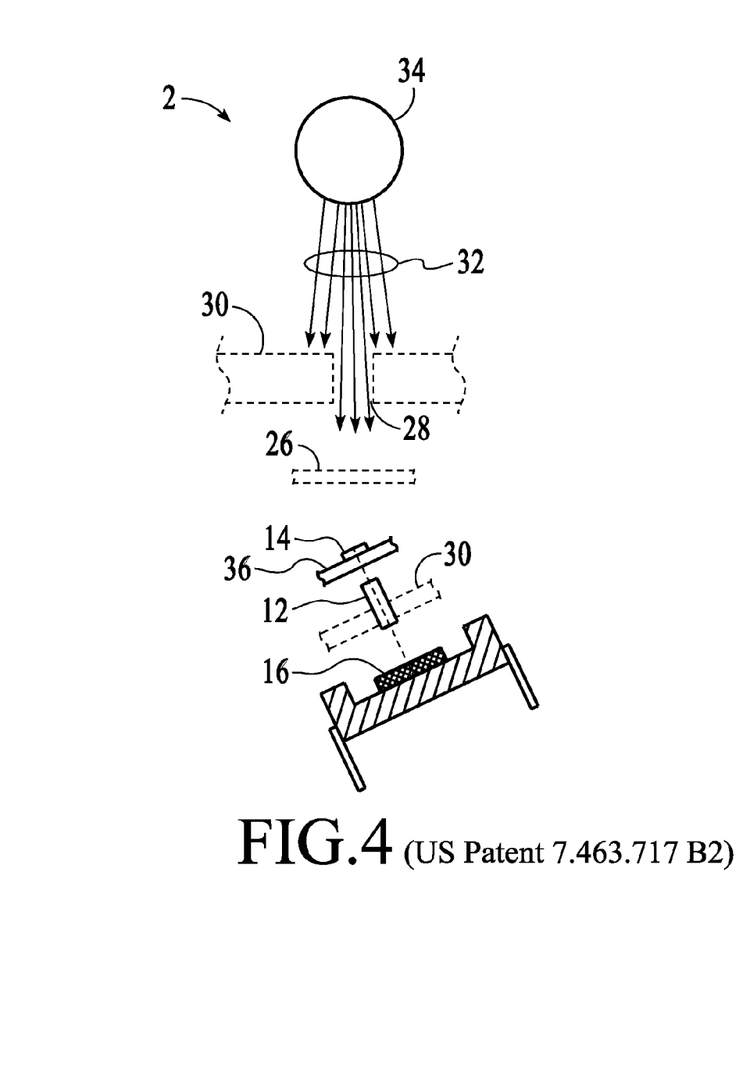
FIG. 4 shows the invention of U.S. Pat. No. 7,463,717 B2, using a rod lens array to alter the optical path and eliminate the direct exposure of X-ray beam on the electrical detecting components.

There are two inventions that are specifically aimed at eliminating and reducing the disadvantages associated with the above mentioned Direct Coupled and Fiber Optics Coupled X-ray Detector Systems. In U.S. Pat. No. 7,463,717 B2, a rod lens array is used to focus the visible light onto an image sensor array (PDA) after the X-ray flux has been converted as depicted in FIG. 4. The rod lens array and the image sensor array is offset by an acute angle relative to the centerline of the X-ray flux path from the X-ray source, such that electrical components of the detector system are removed from the X-ray flux path.

Figure 5:
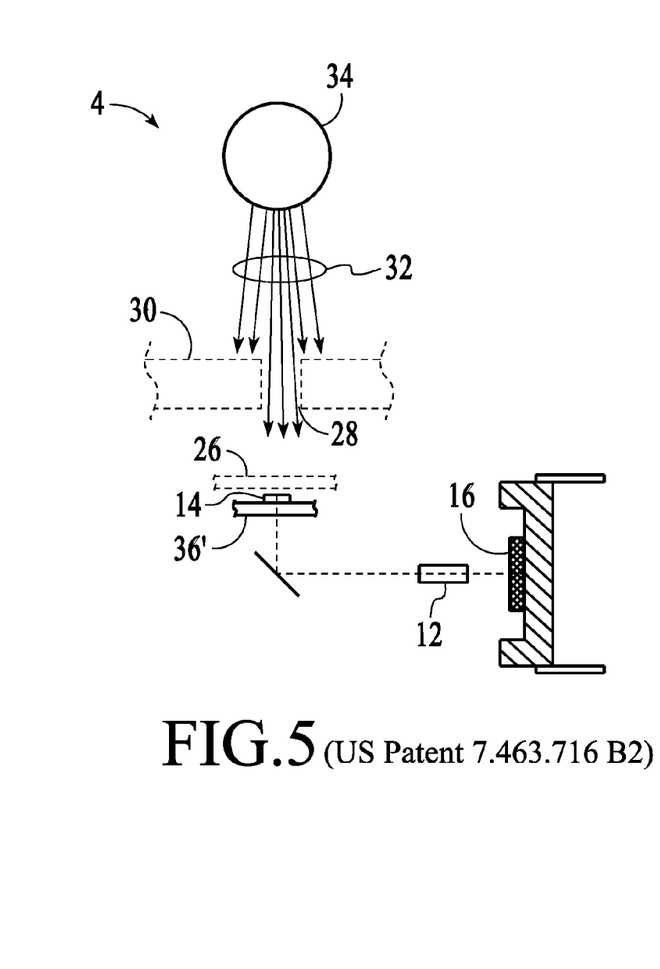
FIG. 5 shows the invention of U.S. Pat. No. 7,463,716 B2, using a rod lens array and a deflector to alter the optical path and eliminate the direct exposure of X-ray beam on the electrical detecting components.

In U.S. Pat. No. 7,463,716 B2, in addition to using a rod lens array for focusing the visible light onto the image sensor array, as shown in FIG. 5, a reflector (a prism or a mirror) is used to reflect the light by ninety (90) degrees and thus remove the electrical components of the detector system from the X-ray flux path. Although both inventions remove the problems associated with direct exposure of X-ray flux onto the image sensor array and other electrical components, the rod lens array has limited light collection efficiency, resulting in loss of light signal. Depending on the models, a rod lens array normally has a light collection angle of about a few tenths of a degree; as a result a significant amount of light signal will be lost.

Accordingly, it is an object of the present invention to provide an X-ray detector system that is long-lived, compact, low cost, and that has a simple mechanical structure that lends itself to simple production assembly with minimal requirements for alignment, adjustment and calibration testing.

Another object of the present invention is to reduce X-ray exposure on components that are sensitive to radiation damage by completely isolating or shielding the components in the detector system from X-ray exposure.

A further objective of the current invention is to provide an X-ray detector system with high signal light collection efficiency and thus reduce the power requirement of the X-ray source.

SUMMARY OF THE INVENTION

It is well known that X-rays cannot be focused, and can only be controlled with a shield (typically formed from lead or other heavy metal) with aperture stops. This is why X-rays require one-to-one imaging, and why the scintillating layer needs to be in direct contact with the image sensor in the prior art systems described above. A key feature of the present invention is the utilization of the one-to-one image transfer characteristics of a fiber optic face plate (FOFP) to maintain the light collection efficiency and the resolution in the X-ray detector system while allowing flexibility in designing the image capture optical path.

The present invention is a radiation damage resistant linear X-ray detector array system. The detector array system is based on unique coherent light transferring characteristics of a fiber optic face plate. A fiber optic face plate is a coherent multi-fiber plate which acts as a zero-depth window, transferring an image pixel by pixel (fiber by fiber) from one face of the plate to the other face. FOFPs are often found in high-end imaging applications bonded to CCDs, voltage stand-off devices in electron microscopes and cathode ray tubes, and as substrates for phosphors. FOFPs are usually created as fiber optic blocks (also called boules) which are fused under heat and pressure. Plates are sliced from the boule, then ground and polished to the desired size. These can be as large as 355 mm (14 inches) square or as small as a few microns across, with thickness from more than 100 mm down to a practical limit of 50 to 100 um. In addition, the polished face of an FOFP can be shaped as required.

The system includes a layer of scintillating material, a fiber optic face plate (FOFP), and an array of image sensors. Some of the viable options for the scintillating material are $Gd_2O_2S$:Tb (GOS or GADOX), CsI(Tl), and $CdWO_4$. The FOFP is cut to match the size of the image sensor detector array, such as a PDA. The bottom face of the FOFP is glued (bonded) to the surface of the detector array with optical glue. The layer of scintillating material is then placed on the top face of the FOFP and is used to convert the impinging X-ray energies into visible light, which can be detected efficiently by the image sensor array. The thickness of the scintillating material layer is in the range of a few hundreds of microns to a few millimeters for X-ray energy up to 450 KeV. For high-energy X-ray applications, such as from 500 KeV to over 10 MeV, a crystalline scintillating block from a few millimeters to over 10 mm needs to be used for higher X-ray conversion efficiency. The FOFP is used to transfer the visible light onto the image sensor array after the X-ray flux has been converted. The photon energy of the visible light is collected by the scanning image sensor array that converts the photon energy proportionally into electrical video signals and enables it to be processed using standard signal and image processing software and equipment. The FOFP and the image sensor assembly can be offset by an acute angle relative to the centerline of the X-ray flux path from the X-ray source, and thus avoid direct exposure of the X-ray flux on the detecting electrical components of the detector system.

Utilization of the fiber optic face plate enables the user of the present invention to isolate or shield the radiation sensitive semiconductor components from X-ray exposure in an X-ray detector system.

Another advantage of using fiber optic face plate in an X-ray detector system is that the FOFP has very high light collection and transfer efficiency and as a result, there is very minimal signal light loss.

Another advantage of using a fiber optic face plate in an X-ray detector system is its physical structure. The FOFP is a single solid piece with an array of bonded optical fibers. This enables FOFP to be easily glued on the image sensor with little or no positional adjustments, thereby yielding an X-ray system that can be easily implemented with little or no optical adjustments, as opposed to the many adjustments required for a Fiber Optics Coupled System.

Still another advantage of the present invention is that the existing low-cost and volume production of the linear FOFPs allows the X-ray Detector Systems, according to the present invention, to also be produced at low cost.

Another advantage obtained by using an FOFP in the system is the ability to transfer the images from the scintillating layer to the image sensor array, hence providing a means to alter and modify the optical path while preserving high resolution, i.e., the MTF, modulation transfer function.

Still another advantage is that the present invention provides low-cost and simple methods of shielding the radiation sensitive components of the system from exposure to damaging X-ray flux.

Another advantage of the present invention is that it enables the manufacture of a small, portable X-ray Detector Machine.

Yet another advantage of the present invention is that with the small enclosure size required and the methods of radiation shielding, it is possible to design Dual or Multi X-ray Scanning Machines enclosed in the same space currently used to enclose a Single X-ray Scanning Machine. The Dual or Multi X-ray Scanning Machines can be used for scanning a target simultaneously in different X-ray energy ranges for better detection.

Still another advantage arising from the small size and shielding properties of the present invention is that it is possible to implement a three-dimensional X-ray scanner, in which two scanning detector systems are positioned orthogonally with respect to each other.

Another advantage arises from the image transferring characteristics of the FOFP. The FOFP has a resolution capability much higher than that of the scintillating material, and therefore is not the limiting factor in the system resolution.

These and other objects and advantages of the present invention will become apparent to those skilled in the art in view of the description of the best presently known mode of carrying out the invention as described herein and as illustrated in the drawings.

BRIEF DESCRIPTION OF THE DRAWINGS

FIGS. 2a-b show the optical-mechanical configuration of a prior art Direct Coupled Detector System.

FIGS. 3a-b illustrate the optical-mechanical configuration of a second prior art system, a Fiber Optics Coupled Detector System.

DETAILED DESCRIPTION OF THE PRESENT INVENTION

Figure 6:
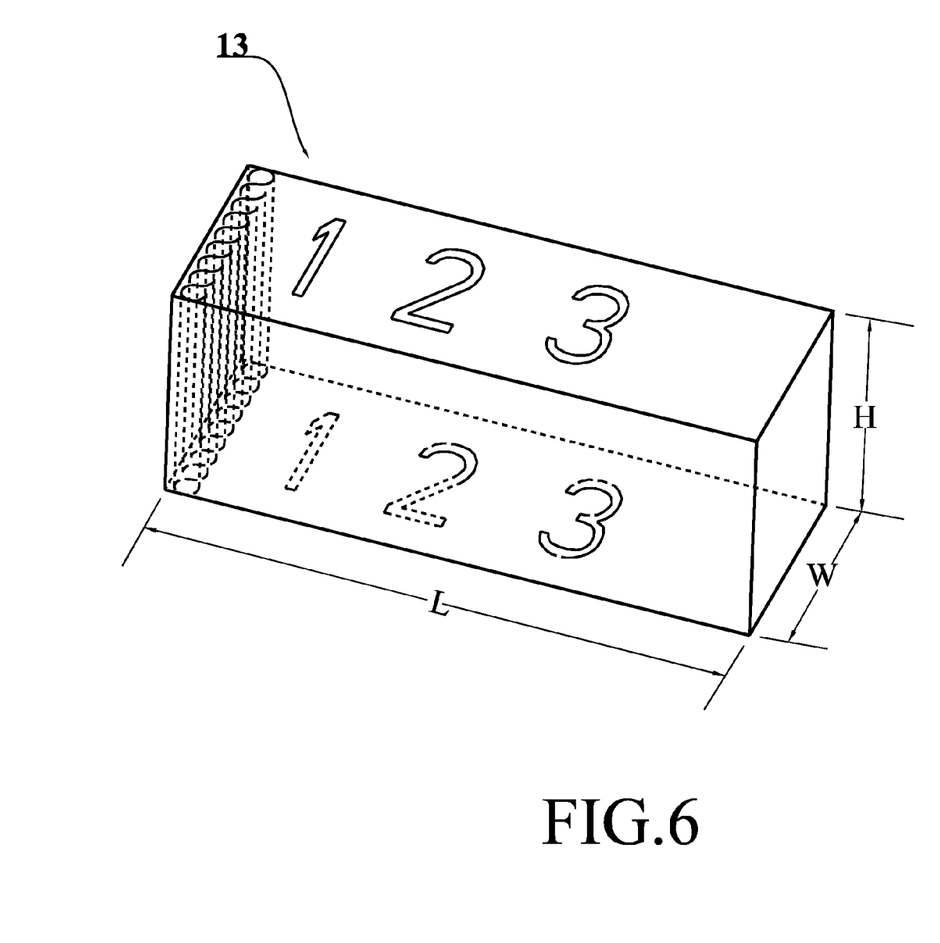
FIG. 6 illustrates the linear fiber optic face plate (FOFP) block used in the present invention. It acts as a zero-depth window, transferring an image pixel by pixel (fiber by fiber) from one face of the plate to the other.
Figure 7:
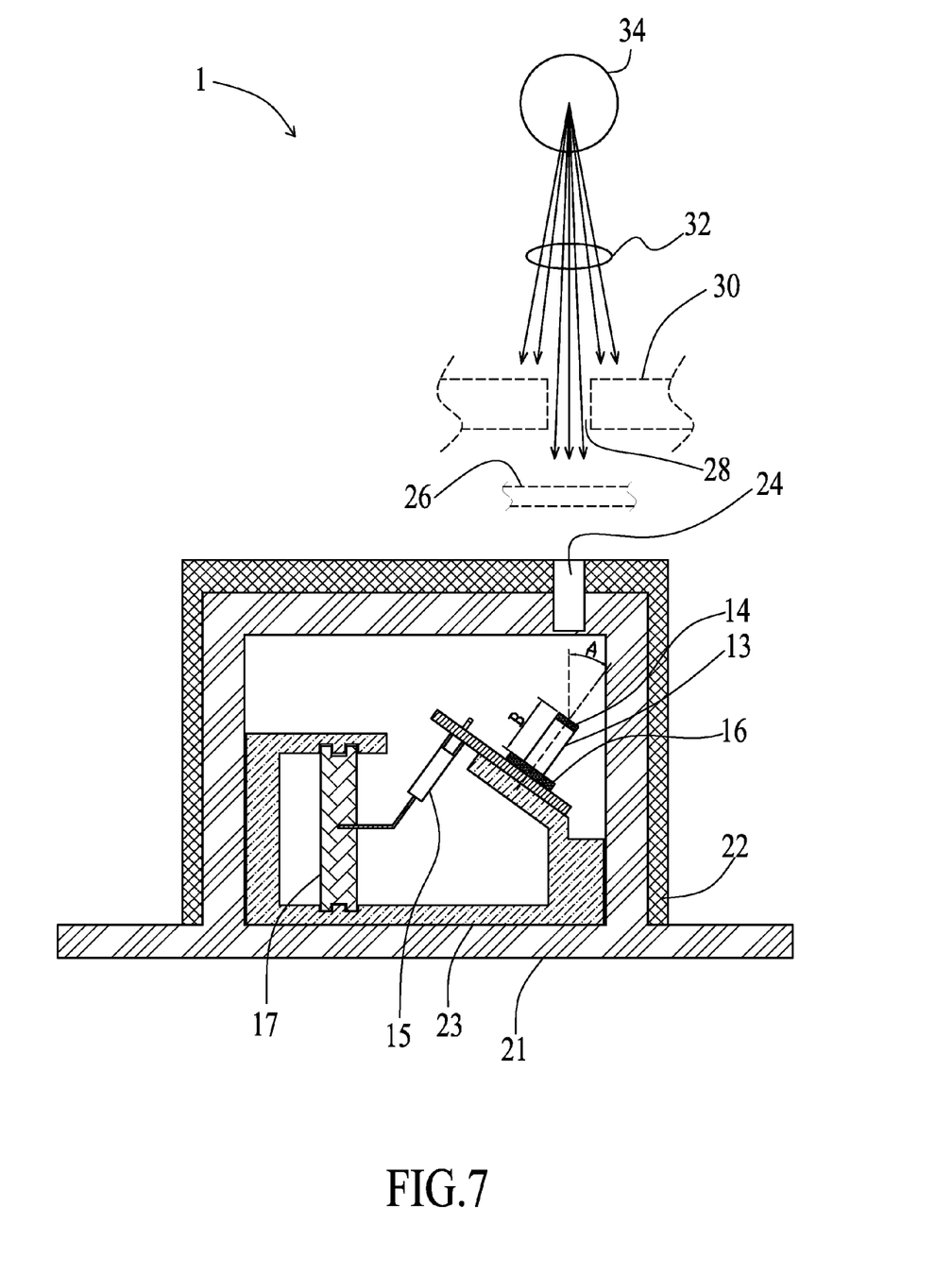
FIG. 7 illustrates an application of the present invention that uses a fiber optic face plate to separate the optical path of the system from the X-ray path to isolate the radiation sensitive components in the system from X-ray radiation exposure.

The present invention is a linear X-ray detector system 1 (FIG. 7). The detector system 1 is based on a unique image transferring characteristic of a fiber optic face plate 13, as illustrated in FIG. 6. The fiber optic face plate 13 is installed in the detector system 1 as illustrated in FIG. 7. FIG. 7 is a cross-sectional view of the X-ray detector system 1. The length of the detector perpendicular to the plane of the paper is determined by the length of the specimen to be scanned. The detector system 1 comprises a layer of scintillating material 14, a fiber optic face plate (FOFP) 13, and an array of image sensors 16.

Some of the viable options for the scintillating material layer 14 are $Gd_2O_2S:Tb$ (GOS or GADOX), CsI(Tl), and $CdWO_4$. As described more fully below, the layer of scintillating material 14 is placed on the top surface of the FOFP 13 and is used to convert the impinging X-ray energies into visible light, which can be detected efficiently by the image sensor array 16. FIG. 6 illustrates the structure of the FOFP 13 used in the detector system 1 of the present invention. FOFPs are formed by fusing optical fibers together under heat and pressure into a block. The block can be cut and polished to the desired size to fit the image sensor array 16. In FIG. 6, the FOFP 13 is depicted as a linear block. The length of the linear FOFP block in the image sensor array direction can be over 12 inches long. The height of the FOFP block in the optical path direction can be over 4 inches tall. The width of the block can be from 50-100 um to one inch to fit the size of the image sensor detector. In the left edge of the FOFP block, it shows individual fibers which form the block. If a linear FOFP block longer than 12 inches is required, it can be formed by butting several blocks together end to end. The bottom surface of the FOFP block is attached to the surface of the image sensor 16 using optical glue. The FOFP block covers the entire optically sensitive area of the image sensor. The FOFP block acts as a zero-depth window and transfers the optical signal generated by the scintillating layer 14 pixel by pixel (fiber by fiber) onto the image sensor 16 detector surface.

A property of the FOFP block 13 that proves to be a great advantage in the present invention is the preservation of the MTF, Modulation Transfer Function. MTF is a means of measuring the resolution of an optical system. The resolving power of a high density FOFP block 13 has a resolution in excess of 90 LP/mm (2400 DPI is equivalent to 94 LP/mm). One of the better quality X-ray scintillating materials, Lanex $Gd_2O_2S:Tb$, has a resolution of 14 LP/mm. Comparison of these resolutions shows that generally the resolution of the X-ray scintillating material is the limiting factor in the optical path when FOFPs are used as the image transferring medium.

Referring now to FIG. 7, the image sensor assembly, which consists of the image sensor 16, FOFP block 13, and scintillating layer 14, is placed on a metal fixture 23. The metal fixture 23 also holds the connector 15 and signal processing electronics 17. The connector 15 connects the image sensor 16 to the signal processing electronics 17 for processing. The image sensor assembly is placed on the metal fixture 23 in such a way that its optical path is rotated through a small angle A relative to the vertical axis which is the path of exposing X-ray beam 32. This orientation allows the image sensor 16 to be positioned out of the X-ray flux path. The metal fixture 23 with the image sensor assembly and signal processing electronics 17 are housed in a metal enclosure 21. Metal shields 22 made from heavy metal such as lead or tungsten alloy are placed on the top and side surfaces of the metal enclosure 21 to protect the electrical components from the X-ray beam damage. An aperture 24 in metal shield 22 and partially on metal enclosure 21 to allow the exposing X-ray beam to enter the detecting system. The partial opening of the metal enclosure 21 is to prevent any ambient light entering the X-ray detecting system. The thin layer of metal at aperture 24 is transparent to the X-ray beam. The aperture 24 also acts to collimate the exposing X-ray beam.

The X-ray detector system 1 employs the FOFP block 13 to transfer an image of a test specimen from the scintillating material layer 14 to the image sensor array 16. The exposing X-ray beam 32 from the X-ray source 34 passes through an aperture 28 in a first lead shield 30. The aperture 28 limits the flux area of the exposing X-ray beam 32 so that the flux is confined to the vicinity of the testing area on the test specimen 26. The confined exposing X-ray beam 32 freely passes through the test specimen 26 and enters into the detecting system through aperture 24. The aperture 24 only allows a narrow collimated X-ray beam, wide enough to expose on the scintillating layer 14, to enter the detecting system. The collimated exposing X-ray excites the scintillating material layer 14 proportionally to the X-ray density patterns of the test specimen 26. The converted optical image on the scintillating material layer 14 surface is directly transferred onto the image sensor array 16. The image sensor 16 converts the optical image into electrical signal. The signal processing electronics 17 then processes the signal before sending the data to an outside host computer for further signal processing.

In this invention, the image sensor assembly—the scintillating material layer 14, the FOFP block 13, and the image sensor 16—is rotated through a small angle relative to the exposing X-ray beam 32 flux path. This orientation allows the image sensor array 16 to be positioned out of the X-ray flux path. As a result, the image sensor array 16 is free from direct radiation exposure while maintaining the advantages of the detector system. Furthermore, the tilted scintillating material layer 14 has slightly more X-ray stopping power and generates slightly more visible light. Therefore light intensity loss in the scintillating material layer 14 due to spread of the projection area can be partially compensated for. There is no longitudinal image distortion in this configuration and thus the linear resolution of the system will be maintained. The diagram shown in FIG. 7 is a cross-section view of the invention. The linear detector system can be any length in the direction perpendicular to the plane of the paper.

Figure 8:
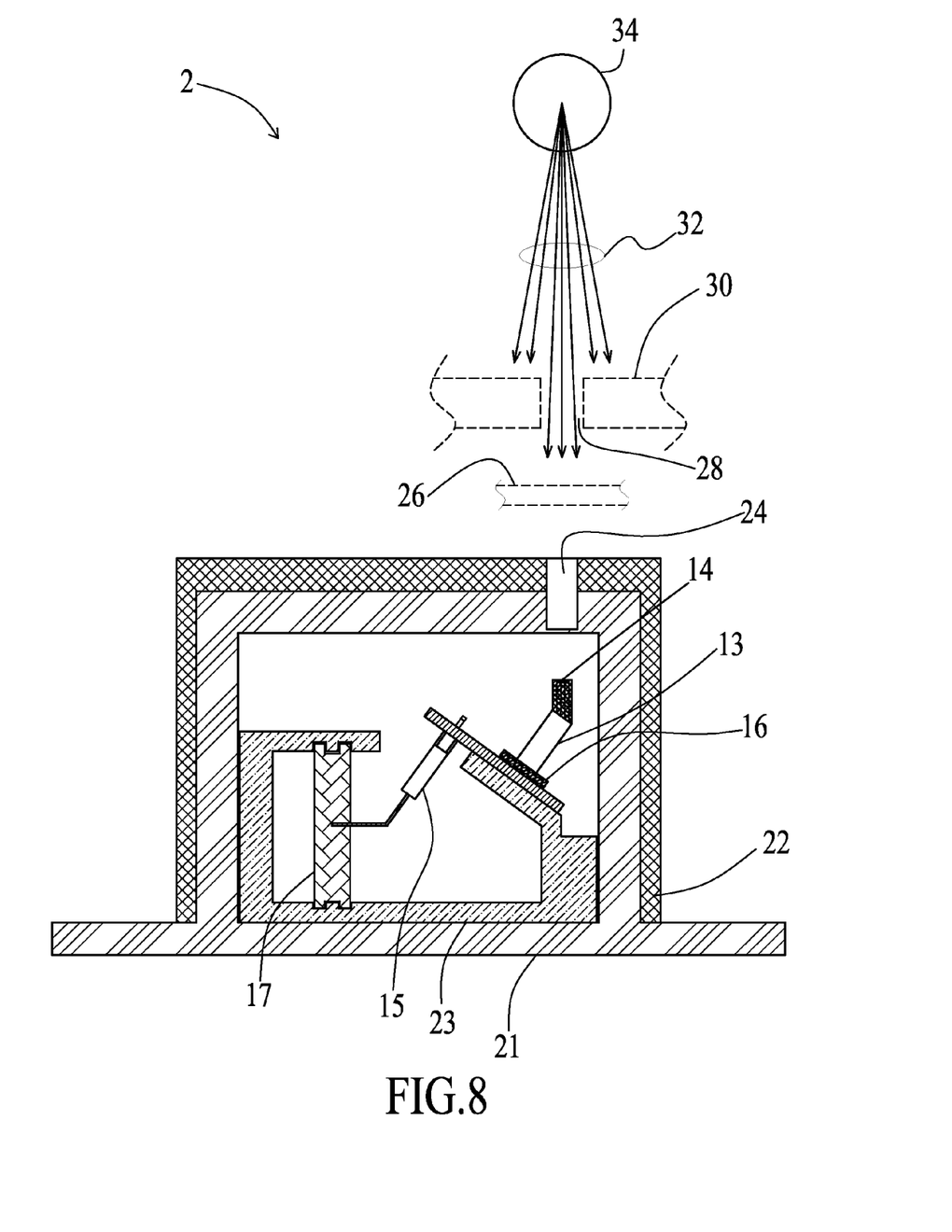
FIG. 8 shows a minor modification of the present invention for high-energy X-ray applications, in which a crystalline scintillating block with beveled surface is used.

FIG. 8 shows a modified implementation of the X-ray detector system 2 for high-energy X-ray applications. In this embodiment, the scintillating material layer 14 is a crystalline block with beveled bottom surface. As a result, the scintillating material block 14 can be placed on an FOFP block 13 in such a way that the top surface of the scintillating material block 14 is nearly perpendicular to the impinging x-ray flux. The thicker scintillating material block 14 and its perpendicular position with respect to the impinging X-ray flux greatly improve the conversion efficiency of the high-energy X-ray photons.

Figure 9:
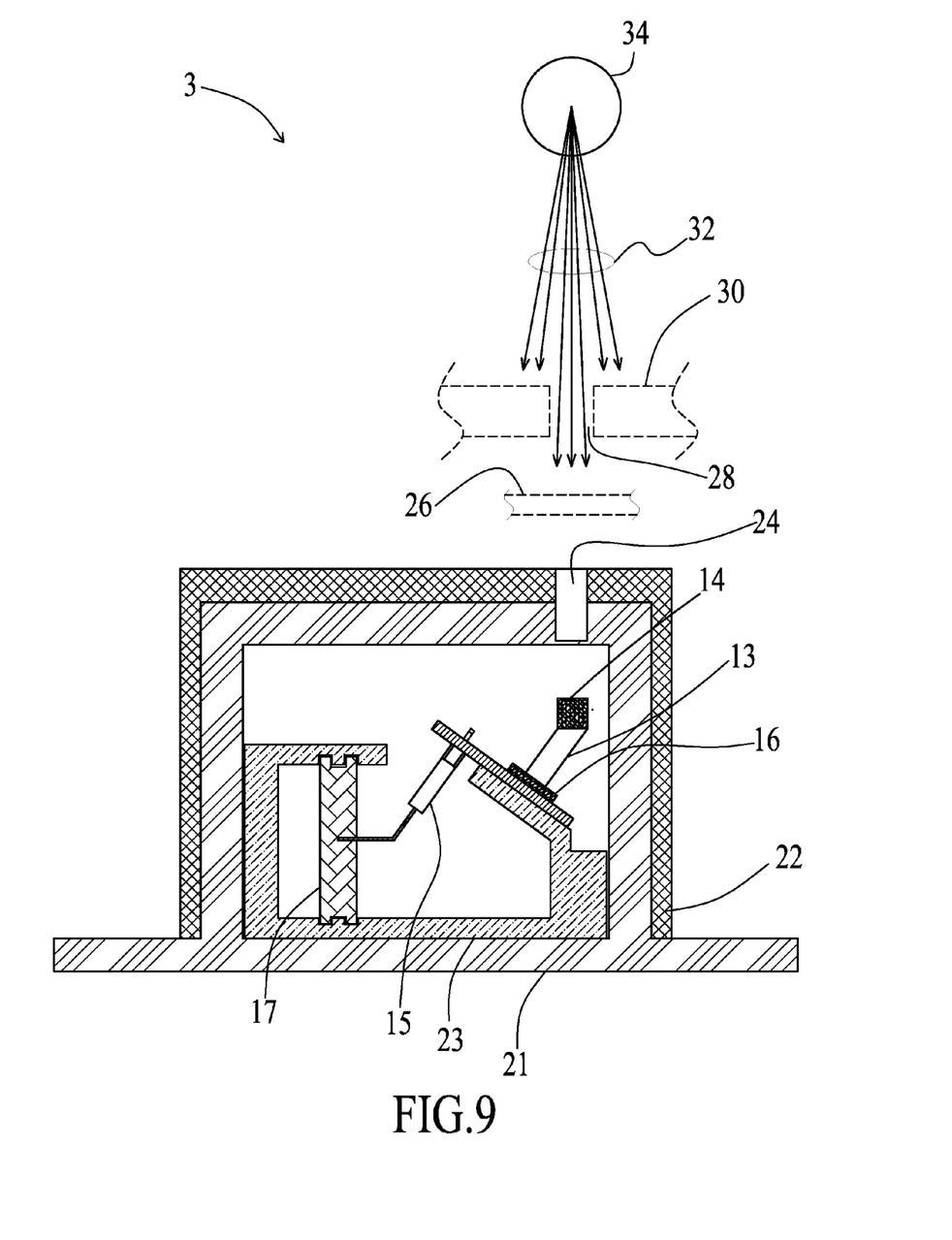
FIG. 9 shows another modification of the present invention for high-energy X-ray applications, in which a crystalline scintillating block and a fiber optic face plate block with beveled surface are used.

FIG. 9 shows another modified implementation of the X-ray detector system 3 for high-energy X-ray applications. In this embodiment, the top surface of FOFP block 13 is beveled so that a rectangular scintillating material block 14 can be placed on FOFP block 13 in such a way that the top surface of scintillating material block 14 is nearly perpendicular to the impinging X-ray flux. Again the thicker scintillating material block 14 and its perpendicular position with respect to the impinging X-ray flux greatly improve the conversion efficiency of the high-energy X-ray photons.

The above disclosure is not intended as limiting. Those skilled in the art will readily observe that numerous modifications and alterations of the device may be made while retaining the teachings of the invention. Accordingly, the above disclosure should be construed as limited only by the restrictions of the appended claims.

We claim:

1. An X-ray detector system comprising:
   an X-ray source,
   a scintillating material layer,
   a fiber optic face plate block, and
   an image sensor array; wherein
   the scintillating material layer is placed on a first surface of the fiber optic face plate block, a second surface of the fiber optic face plate block is attached to the image sensor array, the fiber optic face plate block being perpendicular to a top surface of the image sensor array, and when a test specimen is exposed to an X-ray beam from the X-ray source, the X-ray beam passes through the test specimen and excites the scintillating material layer proportionally to an X-ray density pattern of the test specimen,
   a converted optical image from the scintillating material layer is transferred by the fiber optic face plate block onto the image sensor array, a reproduced image of the test specimen thereafter being read out of the image sensor array, and
   an optical path including the fiber optic face plate block and the image sensor array is offset by an angle less than forty-five degrees relative to a centerline of an X-ray flux path from the X-ray source, such that the image sensor array and analog front-end circuit board electrical components included in the image sensor array are removed from the X-ray flux path.

2. The X-ray detector system as defined in claim 1, wherein the image sensor array is a buttable linear image sensor array.

3. The X-ray detector system as defined in claim 1 wherein, the fiber optic face plate block is a buttable fiber optic face plate block.

4. The X-ray detector system as defined in claim 1, wherein the angle of offset is thirty-two to forty degrees.

5. An X-ray detector system comprising:
   an X-ray source,
   a crystalline scintillating material block,
   a fiber optic face plate block, and
   an image sensor array; wherein
   the crystalline scintillating material block is placed on a first surface of the fiber optic face plate block, a second surface of the fiber optic face plate block is attached to the image sensor array, the crystalline scintillating material block having a beveled surface, the crystalline scintillating material block being placed on the fiber optic face plate block such that the crystalline scintillating material block is perpendicular to an impinging X-ray beam, and when a test specimen is exposed to an X-ray beam from the X-ray source, the X-ray beam passes through the test specimen and excites the crystalline scintillating material block proportionally to an X-ray density pattern of the test specimen,
   a converted optical image from the crystalline scintillating material block is transferred by the fiber optic face plate block onto the image sensor array, a reproduced image of the test specimen thereafter being read out of the image sensor array, and
   an optical path including the fiber optic face plate block and the image sensor array is offset by an acute angle relative to a centerline of an X-ray flux path from the X-ray source, such that electrical components of the image sensor array are removed from the X-ray flux path.

6. The X-ray detector system as defined in claim 5, wherein the image sensor array is a buttable linear image sensor array.

7. The X-ray detector system as defined in claim 5, wherein the fiber optic face plate block is a buttable fiber optic face plate block.

8. An X-ray detector system comprising:
   a crystalline scintillating material block;
   an image sensing assembly;
   a fiber optic face plate block; and
   a mechanical fixture; wherein
   the crystalline scintillating material block is positioned in parallel with a scan line in the path of an imaging X-ray flux, a top surface of the crystalline scintillating material block being perpendicular to a centerline of the imaging X-ray flux so that the crystalline scintillating material block receives the imaging X-ray flux and converts the imaging X-ray flux into visible light, the image sensing assembly comprises an image sensor array, a connector, and an analog front-end signal processing circuit board, the image sensor array converting the visible light into an electrical video signal, the analog front-end signal processing circuit board processing the electrical video signal before the electrical video signal is output to an outside host computer; and wherein the fiber optic face plate block has a beveled top surface which is coupled to a bottom surface of the crystalline scintillating material block, and a square-edge bottom surface which is coupled to the image sensor array, the bottom surface of the fiber optic face plate block covering a sensing area of the image sensor array so that the rectangular fiber optic face plate block transfers the visible light from the crystalline scintillating material block to the image sensor array, and the mechanical fixture holds the image sensing assembly and the fiber optic fiber face plate block so that an optical path passing through the fiber optic face plate block and the image sensor array is rotated by an acute angle of approximately 32 to 40 degrees relative to a centerline of an impinging imaging X-ray flux, so that the image sensor array and the analog front-end circuit board are removed from the path of the imaging X-ray flux.

9. The X-ray detector system as defined in claim 8, wherein the image sensor array is a buttable linear image sensor array.

10. The X-ray detector system as defined in claim 8, wherein the fiber optic face plate block is a buttable fiber optic face plate block.

* * * * *